United States Patent
Wen et al.

(10) Patent No.: US 7,212,967 B2
(45) Date of Patent: May 1, 2007

(54) CHINESE PHONETIC TRANSCRIPTION INPUT SYSTEM AND METHOD WITH COMPARISON FUNCTION FOR IMPERFECT AND FUZZY PHONETIC TRANSCRIPTIONS

(75) Inventors: Say Ling Wen, Taipei (TW); Zechary Chang, Inventec Building, 66 Hou-Kang Street, Shih-Lin Dist., Taipei (TW); Leger Wu, Beijing (CN)

(73) Assignee: Zechary Chang, Taipei (TW)

( * ) Notice: Subject to any disclaimer, the term of this patent is extended or adjusted under 35 U.S.C. 154(b) by 665 days.

(21) Appl. No.: 10/211,524

(22) Filed: Aug. 5, 2002

(65) Prior Publication Data

US 2004/0024604 A1 Feb. 5, 2004

(51) Int. Cl.
*G10L 15/00* (2006.01)

(52) U.S. Cl. ........................ 704/235; 704/249
(58) Field of Classification Search ................ 704/235, 704/249, 260

See application file for complete search history.

(56) References Cited

U.S. PATENT DOCUMENTS

| 5,197,810 | A | * | 3/1993 | Zhang et al. | ............ | 400/110 |
|---|---|---|---|---|---|---|
| 5,787,230 | A | * | 7/1998 | Lee | ............ | 704/235 |
| 6,323,961 | B1 | * | 11/2001 | Rackman | ............ | 358/448 |
| 6,643,124 | B1 | * | 11/2003 | Wilk | ............ | 361/681 |
| 6,792,453 | B1 | * | 9/2004 | Hayashi | ............ | 709/219 |
| 2002/0069058 | A1 | * | 6/2002 | Jin et al. | ............ | 704/249 |

* cited by examiner

*Primary Examiner*—Daniel Abebe
(74) *Attorney, Agent, or Firm*—Birch, Stewart, Kolasch & Birch, LLP

(57) ABSTRACT

A Chinese phonetic transcription input system and method that applies the comparison functions of imperfect and fuzzy phonetic transcriptions. The disclosed invention employs classified input methods for Chinese characters, phrases or sentences to process documentary editing. Users are able to make an immediate selection in the input system for relevant Chinese characters, phrases and sentences from the database through the comparison functions of imperfect and fuzzy phonetic transcriptions after inputting a phonetic transcription message in the input edit column. Through the input system, relevant Chinese characters and phrases can be rapidly found and listed in the elected characters and phrases column, so that users are able to choose a desired character, phrase or sentence with a hotkey. Moreover, the input system also provides an automatic store function for expanding Chinese characters, phrases and sentences. Therefore, the Chinese character key-in speed can be improved, and the time users spend in inputting the same text can be reduced.

9 Claims, 7 Drawing Sheets

CHINESE PHONETIC TRANSCRIPTION INPUT SYSTEM AND METHOD WITH COMPARISON FUNCTION FOR IMPERFECT AND FUZZY PHONETIC TRANSCRIPTIONS

FIELD OF THE INVENTION

The invention relates to a Chinese phonetic transcription input system and method, and in particular, a Chinese phonetic transcription input system and method with a comparison function for imperfect and fuzzy phonetic transcriptions.

RELATED ART

"Input method" is a common tool for people to edit a large quantity of documentary data. A presently focused subject for people is data key-in speed, which is affected by data input methods and the accuracy of searching and matching data provided by these input methods.

There have been various technological developments of Chinese input methods during the previous transformation process. However, according to presently known techniques and research, most of these methods resolve the problem of improving key-in speed from the aspect of users' key-in methods and Chinese character selections. For instance, (1) Character Shape Input Methods, which are designed as particular disassembling input methods according to Chinese character shapes, include the Chang-Jei Input Method, the Boshiamy Input Method, the Determinant Input Method, the Ta-I Input Method, etc. Using these Chinese input methods to edit documentary data, a user needs to spend some time to learn and memorize specific input methods of disassembling Chinese characters. This brings a certain bottleneck-like learning limitation to beginners, and usually makes them give up learning and using these kinds of input methods. (2) Phonetic Alphabet Input Methods, which are designed as input methods using Chinese character phonemes through phonetic symbols, Mandarin phonetic transcriptions or general phonetic transcriptions, include the Phonetic Symbol Input Method, the Mandarin Phonetic transcription Input Method, etc. By using phonetic symbols or Mandarin phonetic transcriptions, a user spells using English letters to choose the desired Chinese character from the matching characters and phrases database. This input method necessitates mechanically choosing word for word, so it takes time to key in English letters, and slows the input speed when a user keys in similar words or phrases in one article. In view of the defects of word for word key-in and selections, the improved design of intellectual comparison has been added to these kinds of input methods, such as the Microsoft New Phonetic Input Method, the Natural Input Method, etc. These kinds of input methods employ intellectual comparison based on the phonetic transcription message inputted by users. If the inputted phonetic alphabet string is a single phonetic transcription, Chinese characters with the highest frequency of this single phonetic transcription are displayed in the input edit column. If the Chinese character sought by the user does not appear, the user can open an elected characters and phrases column to choose another matching Chinese character. If the inputted phonetic alphabet string is a compound phonetic transcription, the highest frequencies of words or sentences are displayed in the input edit column by searching a words database, phrases database or sentences database according to the phonetic alphabet strings. Likewise, users can open the elected characters and phrases column to choose another words or sentences, if the Chinese character, phrase or sentence is not what the user seeks.

The most unacceptable situation in this kind of input method is that the displayed words, phrases, or sentences through the intellectual comparisons are still not what a user is seeking. Moreover, it is troublesome for users to operate and select needed words, phrases, or sentences. Hence, how to design and develop an easier Chinese phonetic transcription input method to process imperfect and fuzzy phonetic transcription comparisons and generate various optional Chinese characters and phrases, which enables a user to rapidly and conveniently choose Chinese characters with the function of instantly recording and expanding for data key-in speed of Chinese characters, is still an unresolved breakthrough technology.

SUMMARY OF THE INVENTION

In view of the foregoing, the invention aims at resolving the preceding disadvantages by providing the method for a Chinese phonetic transcription input system with comparison functions for imperfect and fuzzy phonetic transcriptions. After receiving the phonetic transcription message inputted by a user, the input system compares its imperfect and fuzzy phonetic transcriptions. The number of matched characters and phrases increases during the comparisons. To avoid reducing users' key-in speed, the disclosed system adapts a classifying method for Chinese characters, phrases, and sentences by means of pop-up windows to rapidly display in the elected characters and phrases column the relevant characters and phrases being searched and compared by the system. The sequence of matched characters and phrases is displayed by the priorities of completely successful matches, and then reasonably and frequently repeated characters and phrases. Users are able to choose words via the hotkeys. Finally the system automatically records and expands the frequently used characters and phrases to the database according to a user's key-in habits. Therefore, the system achieves the goals of shortening key-in time and improving efficiency in entering Chinese characters.

The foregoing, as well as additional objects, features and advantages of the invention will become more readily apparent from the following detailed description, which proceeds with reference to the accompanying drawings.

BRIEF DESCRIPTION OF THE DRAWINGS

FIG. 4 is a flowchart of the invention; and.

DESCRIPTION OF THE PREFERRED EMBODIMENT

Figure 1:
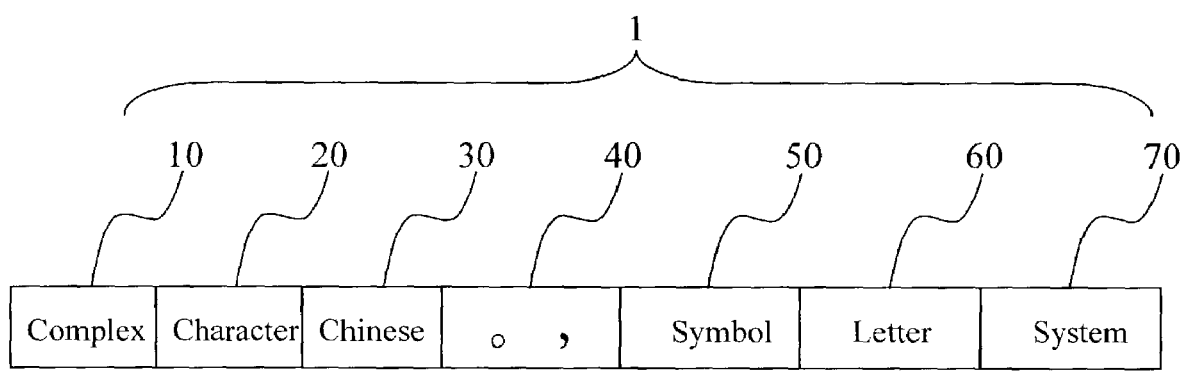
FIG. 1 is a schematic representation of the input function row panel of the invention.

The feasibility and practicality of the invention will be elaborated by means of an embodiment depicted in the following. With reference to FIG. 1, when executing this Chinese phonetic transcription input system to edit documents, users can see the input function row panel 1 as shown in FIG. 1. This input function row panel 1 consists of the following function buttons: (1) Complex/simplified Chinese character switch button 10, which is to switch between complex and simplified Chinese characters. (2) Character/phrase/sentence classification switch button 20, through which users can switch either to character/phrase input modes or to a sentence input mode in the input system. When the input system is in character input mode, the button displays "character". (3) Chinese/English input mode switch button 30, which is to switch between Chinese and English input modes. (4) Full-shape/half-shape input mode switch button 40, which is to switch between full-shape and half-shape character or symbol input modes. (5) Special symbol input button 50, which is displayed on the screen (not shown in any figure) for users to input messages and choose symbols in this column by clicking the button. (6) Writing panel option button 60; a function menu is displayed on the screen (not shown in the figure) for users to choose one of official document formats among "social interaction", "routine work", and "business affairs" while clicking the button to edit documents. (7) System setup and online instruction button 70, which enables the setup of the function interface of this input system, as well as switches the input function row panel 1 on and off. This button also provides the online help function, through which users can clearly understand the guidelines and rules of operating the input system. Moreover, users can proceed with the online update function through this button.

Figure 2A:
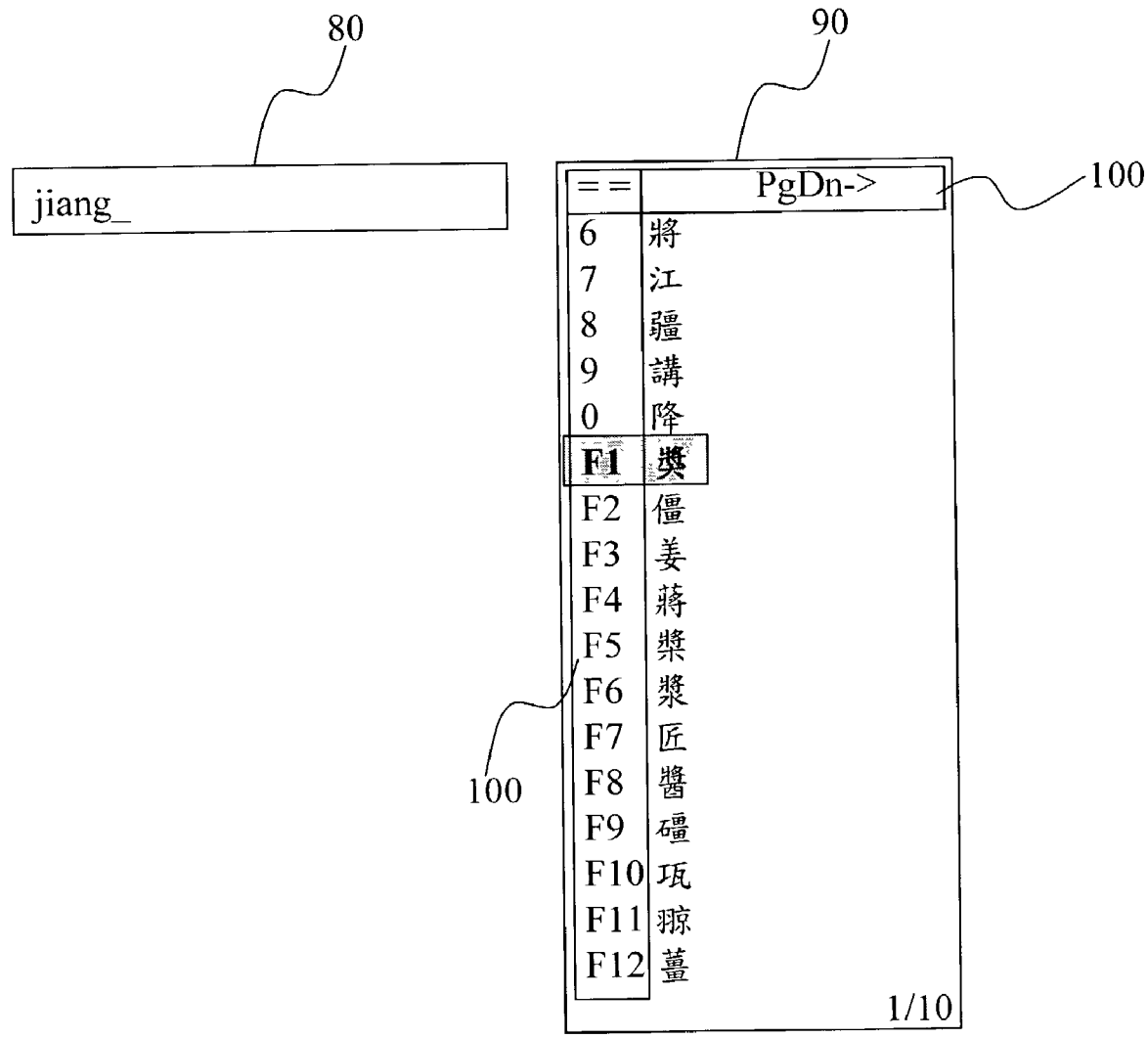
FIGS. 2A~2C are schematic representation of the operating conditions of the invention.
Figure 2B:
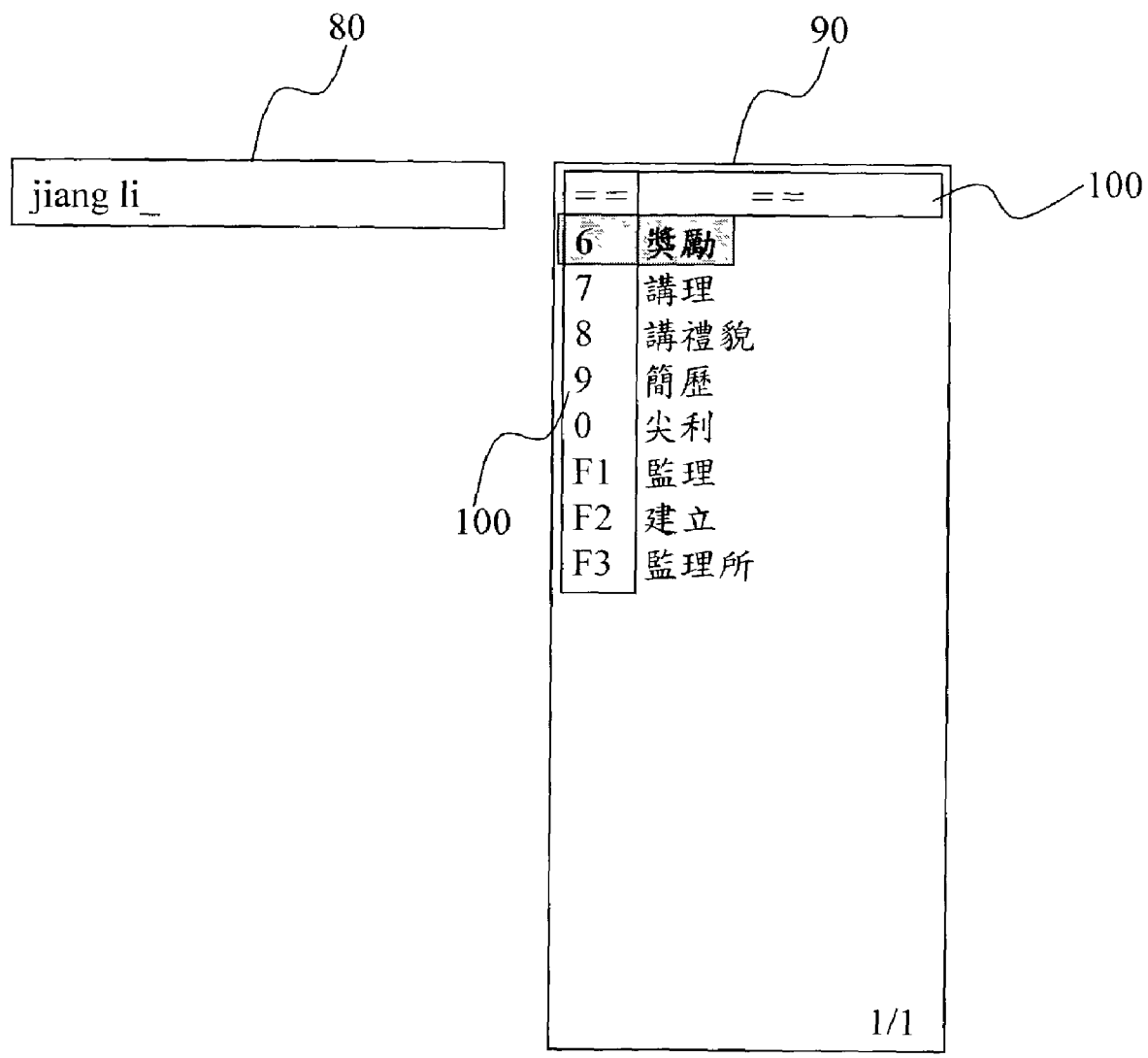
Figure 2C:
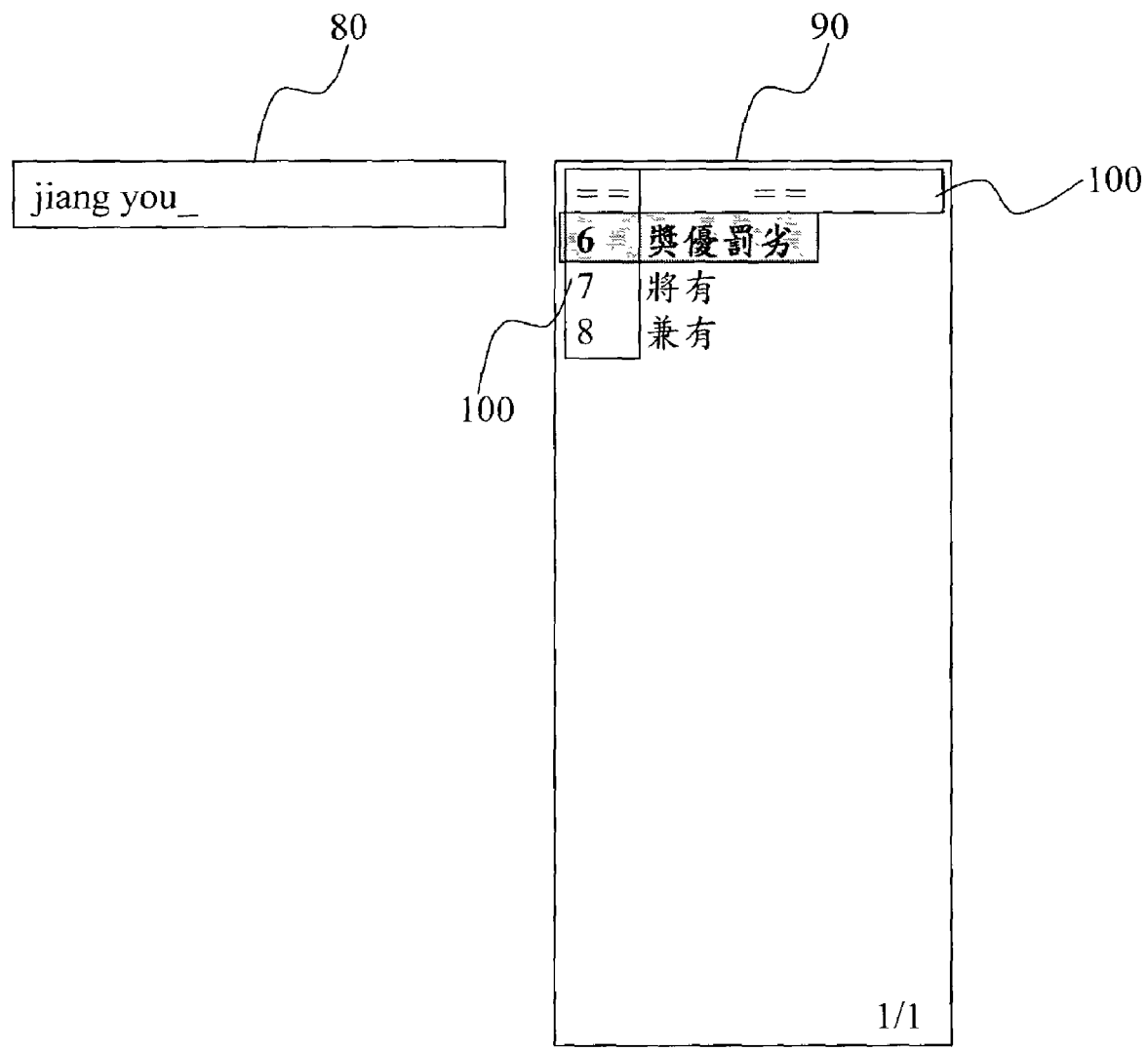

In regard to the operation statuses of the input system, refer to FIGS. 2A, 2B, and 2C. After a user operates this Chinese phonetic transcription input system, the input function row panel 1 is shown on the screen. A user can key in phonetic transcription messages in the input edit column 80 through the character/phrase/sentence classification switch button 20. The system then enters the character/phrase/sentence database 150 to search and match data with inputted messages through the comparison functions for imperfect and fuzzy phonetic transcription messages. Matching Chinese characters and phrases are displayed in the elected characters and phrases column 90 in the order of complete matches and reasonably frequent usage. The user then searches desired Chinese characters, phrases, or sentences by using the hotkeys 100 function of the system. The twenty hotkeys 100 provided by the disclosed invention include: number keys 6~0, function keys F1~F12, and special keys such as ESC, PgUp, PgDn, etc. These keys are for users to rapidly select desired Chinese characters. For example, when in single character mode, "奬" can be found only through keying in "jiang" and clicking the function key F1. When in phrase mode, "奬優罰劣" can be found and selected by keying in "jiang you" and clicking the hotkey of number 6.

Figure 3:
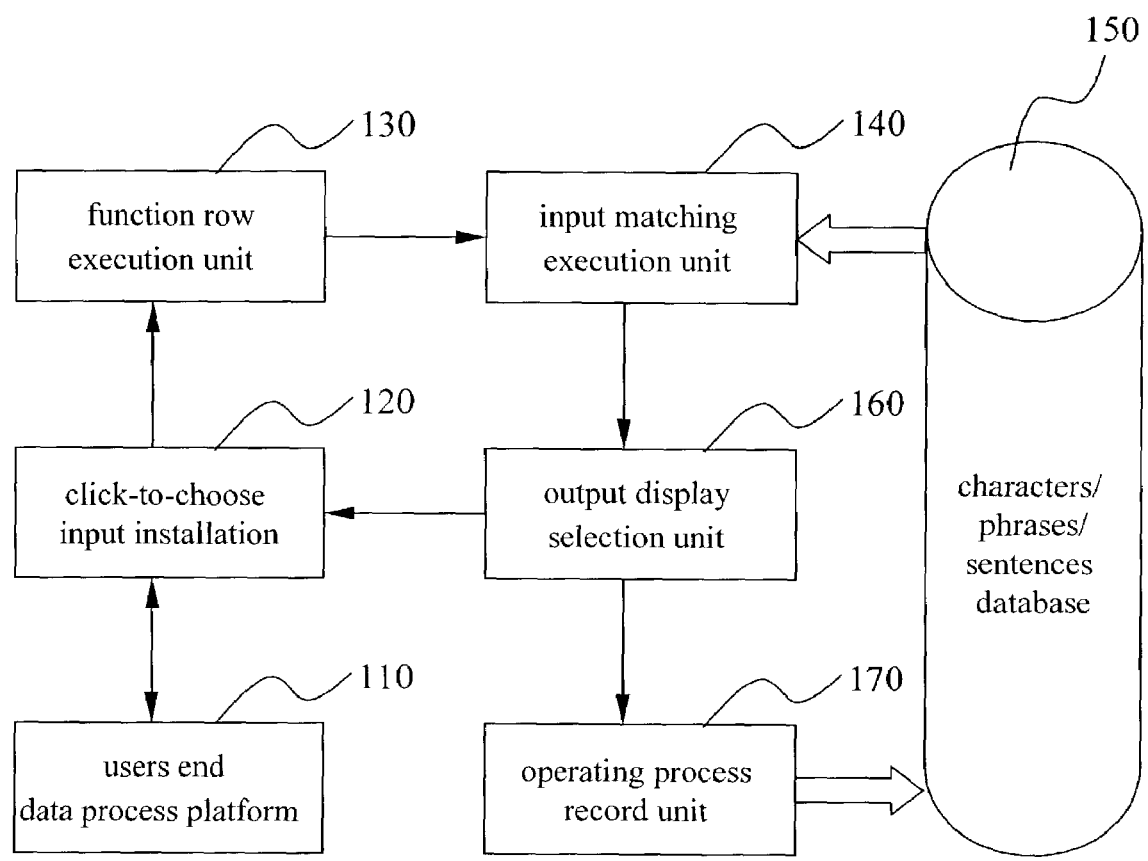
FIG. 3 is a block diagram of the invention.

As shown in FIG. 3, the disclosed Chinese phonetic transcription input system of the invention is comprised of the function row execution unit 130, the input matching execution unit 140, the output display selection unit 160, and the operating process record unit 170. The input system utilizes the data process platform 110 of the user end by using the click-to-choose input installation 120 to operate the function row execution unit 130. The input system immediately displays the input function row panel 1, and then the user keys in phonetic transcription messages in the input edit column 80. According to phonetic transcription messages inputted by the user, the input matching execution unit 140 enters the character/phrase/sentence database 150 to search and match data with imperfect and fuzzy phonetic transcription messages. Finally, the matching Chinese characters and phrases being searched are displayed in the elected characters and phrases column 90 in the order of complete matches and reasonably frequent usage through pop-up windows, which are integrated by the output display selection unit 160. Now the user can choose Chinese characters and phrases via the hotkeys 100. After the user's selection and according to the user's constant character usage, the operating process record unit 170 automatically records frequently used Chinese characters and phrases into the character/phrase/sentence database 150, so as to save time for repeatedly inputting the same characters and phrases thereafter.

Figure 4:
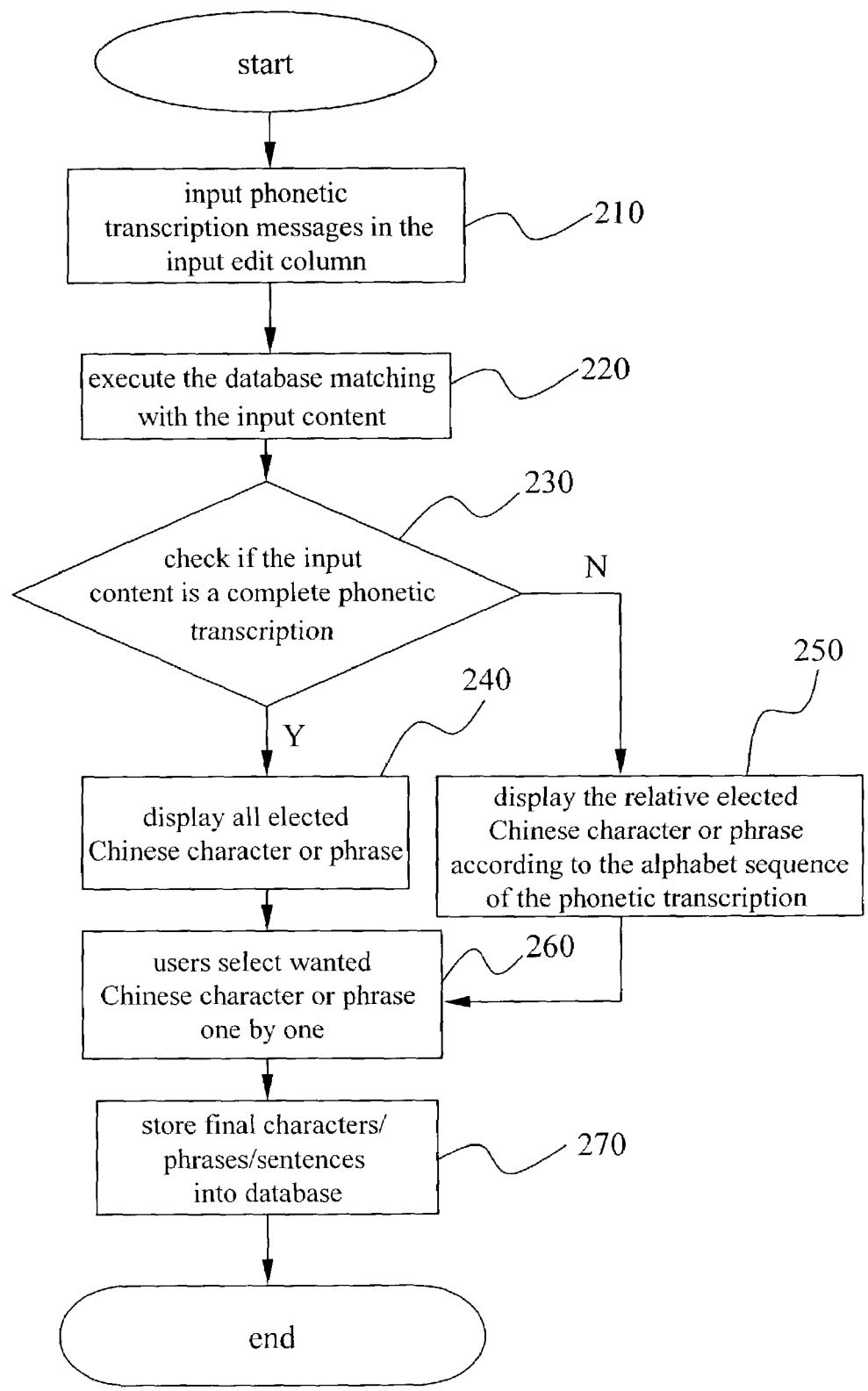

The practical operation process of the invention is shown in FIG. 4. When trying to edit documents on a data processing platform by using the Chinese phonetic transcription input system, a user has to execute the start-up of the input system with the click-to-choose installation. The user then inputs phonetic transcription messages in the input edit column of the system (step 210). After the user inputs phonetic transcription messages, the system enters the character/phrase/sentence database to proceed with data comparisons with inputted content (step 220). The matching principle is to evaluate if inputted content is a complete phonetic transcription (step 230). If the matching result is a complete phonetic transcription, the system displays matching Chinese characters and phrases one by one through successful matches with pop-up windows on the users' process platform (step 240). Alternatively, if the matching result is an imperfect phonetic transcription, the system displays corresponding matched Chinese characters and phrases according to the alphabet sequence of the phonetic transcription message (step 250). No matter what, a user can search word for word desired Chinese characters, phrases, or sentence through the final searching and matching results of imperfect phonetic transcriptions with the system (step 260). Moreover, after the user finishes choosing Chinese characters and phrases, the system automatically stores what the user has selected in the character/phrase/sentence database (step 270) for the purpose of future searching and matching in the system.

Figure 5:
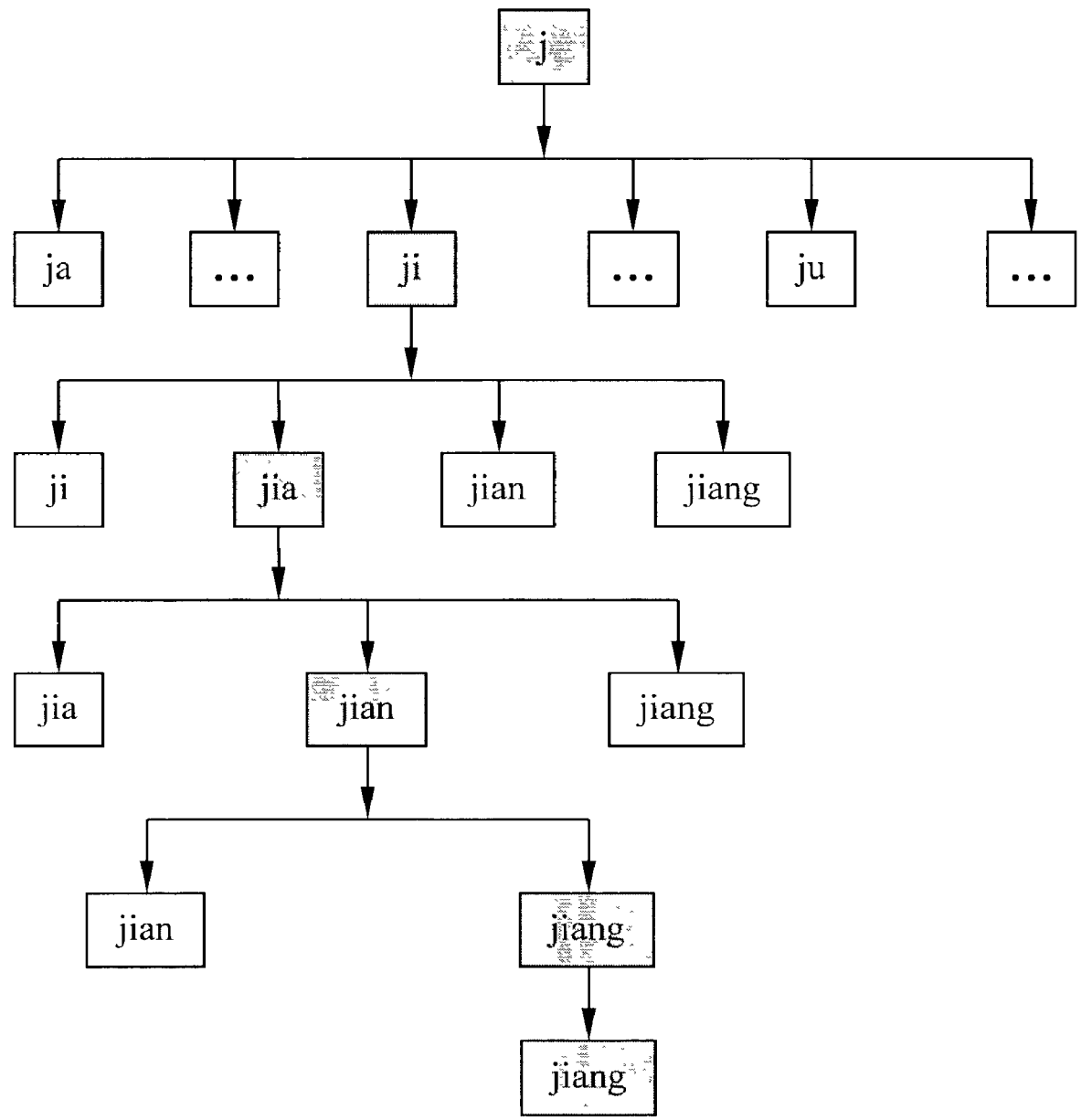
FIG. 5 is a sequence flowchart of the input matching function of the invention.

The sequence process of matching the input of the disclosed invention is as shown in FIG. 5. If a user wants to select the Chinese character "奬" for data input, the input matching execution unit 140 of the system searches all words starting with "j" in the character/phrase/sentence database 150 when the user keys in "j" in the input edit column 80. The matching results of elected Chinese characters and phrases are displayed in alphabetical sequence of phonetic transcriptions in the elected characters and phrases column 90. When the user keys in "ji", the input matching execution unit 140 of the system searches all words starting with "ji". Since "ji" is a perfect phonetic transcription, the matching results for "ji" are displayed in the elected characters and phrases column 90 prior to other elected Chinese characters and phrases in sequence of phonetic transcriptions. When the user keys in "jia", the input matching execution unit 140 of the system searches all words starting with "jia". Since "jia" is a perfect phonetic transcription, the matching results for "jia" are displayed in the elected characters and phrases column 90 prior to other elected Chinese characters and phrases in sequence of phonetic transcriptions. When the user keys in "jian", the input matching execution unit 140 of the system searches all words starting with "jian". Since "jian" is a complete phonetic transcription, the matching results for "jian" are displayed in the elected characters and phrases column 90 prior to other elected Chinese characters and phrases in sequence of phonetic transcriptions. Users are most likely not going to key in such a long string like "jiang". However, without knowing the user's intention of inputting characters, all words representing the longest phonetic transcription string "jiang" are going to be displayed following all words representing the elected phonetic transcription string "jian" for the user to choose. If the user indeed keys in "jiang", only words representing elected characters and phrases of "jiang" are displayed in the elected characters and phrases column 90.

The aforementioned data processing platform at the user end 110 upon which the Chinese phonetic transcription input system is executed can be at least one of the following combinations: a Personal Computer (PC), a Personal Digital Assistant (PDA), a mobile phone, and a Note Book (NB). Within the system, the click-to-choose input installation 120 with the functions of starting-up, inputting, and selecting can be operated from one of the following combinations: a keyboard, a mouse, a digital touch-pad, and a pronunciation recognition system.

ACHIEVEMENTS

The disclosed invention of a Chinese phonetic transcription input system and method employs the comparison function for imperfect and fuzzy phonetic transcriptions to resolve the problems of conventional input systems. With the incomplete comparison function in conventional input systems, with which users input desired characters, phrases, or sentences through complicated operations and options, the systems diminish efficiency in inputting Chinese characters. Thus, the disclosed invention achieves the following:

1. The invention provides input methods for classified characters, phrases, or sentences. Users can choose one of the input methods to edit documents to enhance input speed.
2. The invention employs a method for imperfect and fuzzy phonetic transcription comparisons, so the largest amount of possible elected Chinese characters and phrases are matched for users to choose from.
3. The method of displaying matching Chinese characters and phrases utilizes a pop-up windows to display matching characters and phrases in the order of complete matches prior to other reasonably and frequently used Chinese characters and phrases.

The detailed embodiments of the invention are disclosed herein; however, it is to be understood that the disclosed embodiments are merely exemplary of the invention that may be embodied in various forms and are not a restriction to limit the achievement of the invention. These and other variations, which will be understood by those skilled in the art, are within the intended scope of the invention as claimed below.

What is claimed is:

1. A Chinese phonetic transcription input system with the comparison functions for imperfect and fuzzy phonetic transcriptions, provides an instant search method for users to proceed Chinese phonetic transcription inputting, which system comprises:

a function row execution unit, which utilizes a click-to-choose input installation on one data process platform for generating an input function row panel that enables users to choose and switch input modes on the input function row panel;

an input matching execution unit, is to enable users input a phonetic transcription message in an input edit column of the input function row panel, and the system searches a characters/phrases/sentences database and finds matching data with incomplete and fuzzy phonetic transcriptions to generate an elected Chinese character or phrase;

an output display selection unit, is to receive the elected Chinese character or phrase to be listed in an matched characters and phrases column, and users choose needed Chinese character via an hotkey, in the mean while, the system generates a data storage message; and an operating process record unit, is to receive the data storage message for storing frequently used Chinese characters and phrases by users in the characters/phrases/sentences database.

2. A system as in claim 1, wherein the data process platform is selected from the group consisting of: a Personal Computer (PC), a Personal Digital Assistant (PDA), a mobile phone, and a Note Book (NB).

3. A system as in claim 1, wherein the click-to-choose input installation is selected from the group consisting of: a keyboard, a mouse, a digital touching panel, and a pronunciation recognizing system.

4. A system as in claim 1, wherein the input function row panel consists of the following buttons: a complex/simplified Chinese character mode switch button, a character/phrase/sentence classification switch button, a Chinese/English mode switch button, a full-shape/half-shape mode switch button, a special symbol input button, a writing panel option button, and system setup and online instruction button.

5. A system as in claim 1, wherein the input mode is selected from the group consisting of: character mode, phrase mode, and sentence mode.

6. A system as in claim 1, wherein the elected characters and phrases column are generated through a pop-up window on the data process platform.

7. A Chinese phonetic transcription input method with the comparison functions for imperfect and fuzzy phonetic transcriptions matching function is to enhance Chinese character input speed through a classified method according to various inputted phonetic transcription messages by users, which method comprises:

starting up an input function row panel and chooses an input mode for data input process;

receiving an inputted phonetic transcription message and searches a characters/phrases/sentences database and finds matching with incomplete and fuzzy phonetic transcriptions, and generating a matched Chinese character or phrase; and displaying an elected Chinese character or phrase for users to choose, and storing the chosen Chinese character by users into the characters/phrases/sentences database.

8. A method as in claim 7, wherein the input function row panel consists of the following buttons: a complex/simplified Chinese character mode switch button, a character/phrase/sentence classification switch button, a Chinese/English mode switch button, a full-shape/half-shape mode switch button, a special symbol input button, a writing panel option button, and system setup and online instruction button.

9. A method as in claim 7, wherein the input mode is selected from the group consisting of: character mode, phrase mode, and sentence mode.

\* \* \* \* \*

UNITED STATES PATENT AND TRADEMARK OFFICE
CERTIFICATE OF CORRECTION

PATENT NO. : 7,212,967 B2  Page 1 of 1
APPLICATION NO. : 10/211524
DATED : May 1, 2007
INVENTOR(S) : Say Wen It is certified that error appears in the above-identified patent and that said Letters Patent is hereby corrected as shown below:

Title Page should read

(73) Assignee: INVENTEC CORPORATION, Taipei (TW)

Signed and Sealed this

Twelfth Day of August, 2008

JON W. DUDAS
*Director of the United States Patent and Trademark Office*